June 6, 1944. H. F. PETCH 2,350,697
OIL SEAL
Filed Jan. 27, 1941 2 Sheets-Sheet 1

Horace F. Petch
By
Watson, Cole, Grindle & Watson
Attys.

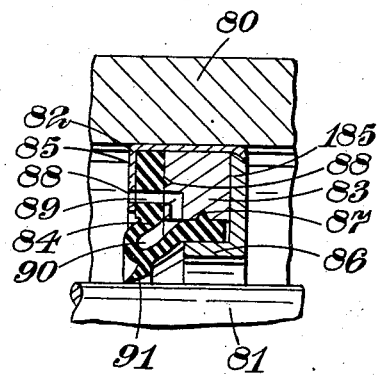
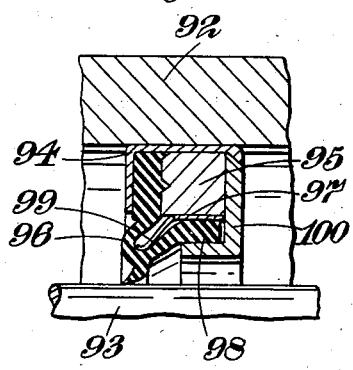
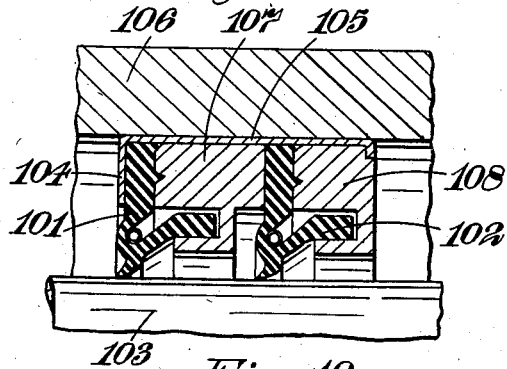
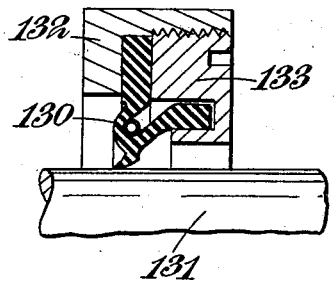
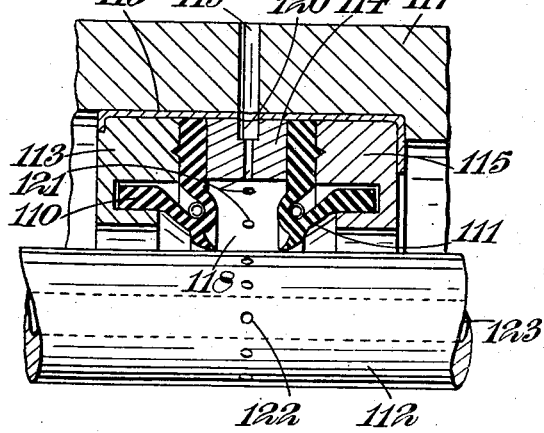
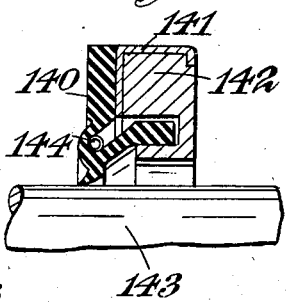

Patented June 6, 1944

2,350,697

UNITED STATES PATENT OFFICE 2,350,697

OIL SEAL

Horace Francis Petch, New Barnet, England

Application January 27, 1941, Serial No. 376,244
In Great Britain January 27, 1940

11 Claims. (Cl. 288—3)

This invention comprises improvements in or relating to means for sealing moving parts against leakage of oil or other liquid or gases or dust or the like.

It is known to provide devices, which are frequently termed oil seals, in bearings for keeping in lubricants and keeping out dust, foreign matter and liquids, air, gases, etc. Such devices can also be used to seal rotating shafts against the passage of gases and for preventing access of water, acids or the like from working parts. The present invention relates to seals of this kind.

In the known oil seals it is usual to provide a metal ring-like casing which supports an angle-leather, moulded rubber, or other fabricated flexible sealing element, one edge or lip of which bears on the shaft or other bearing surface and forms a seal, the casing being made to fit tightly so that leakage cannot pass around it, and the present invention relates to oil seals of this kind. In the known seals a spiral spring joined into itself so as to form an elastic ring presses on the edge of the leather or rubber to assist in making it bear on the surface which is to be sealed. According to whether this surface is a male or female surface the spring presses the leather or rubber or the like inwardly or outwardly against it, being in compression or tension for the purpose. When the sealing element wears or shrinks there is a risk of the spring coming out of the casing and getting into the working parts. Moreover the casing and the spring are exposed to the action of the liquid or other substance against the passage of which the sealing is effected and if these have corrosive properties the parts are not well adapted to withstand the action which ensues. Owing to the hollow construction of the known rings they will collapse if heavy thrust is applied; their function necessarily causes them to be used nearly always close against bearing parts which require location endwise against movement and there they may well be in the way of separate means of location, while their weakness against thrust prevents them from being used themselves as washers for the purpose. It is one object of the present invention to obviate these difficulties.

According to the present invention in a seal of the kind described the flexible sealing element is formed at the sealing lip with a return flap which re-enters into the casing and thus protects the spring and the parts within the casing. The return flap may most conveniently be provided by moulding the flexible sealing element in rubber or a rubberised compound. Alternatively, moulded fabric or asbestos or leather or other substances can be used.

According to a further feature of the invention the casing consists of an angle-section ring, one side of which forms a circular wall and the other side an end-wall against which the flexible sealing element is clamped and from which it projects toward the part to be sealed, and a clamping ring which bears upon and clamps the flexible sealing element in place against said end-wall and completely fills the space between the sealing element and the opposite end of the seal from that constituted by said end-wall. By this means the casing is rendered capable of withstanding severe end thrust and may be either clamped firmly in place without distortion or, if necessary, may be used to transmit end thrust from, say, a ball race on one of the rotating or stationary parts to a housing in which the parts are located. This is frequently a convenience in practice.

The clamping ring is in one construction enclosed by a second angle-section ring one side of which extends along and protects the re-entering portion of the sealing element. Alternatively the clamping ring may be provided with a projecting flange to extend along and protect the re-entering portion of the sealing element and the ring itself may provide the aforesaid opposite end of the seal from that constituted by the end-wall of the angle-section ring.

A second sealing element may be incorporated in the casing between the clamping ring and the said opposite face of the seal, said second sealing element facing in the opposite direction from the first and thus serving to prevent leakage in either direction.

The sealing element may either be directed so that the sealing lip points inwardly and works on a shaft or journal within the sealing ring or it may open outwardly and work on the interior of a hollow member which surrounds it.

The following is a description, by way of example, of certain constructions in accordance with the invention, reference being made to the accompanying drawings, in which:

Figures 7 and 8 are views similar to Figure 2 of further alternative constructions;

Figure 9 shows a double ring;

Figure 10 shows a double ring, the two rings facing inwardly to provide a lubricant chamber;

Figure 11 shows an alternative (screwed) clamping ring, and

Figure 12 shows an anti-corrosive ring.

Figure 1:
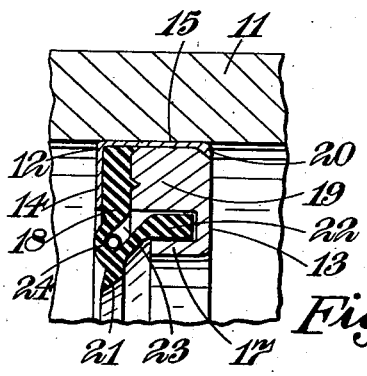
Figure 1 is a section through a part of a bearing housing and a sealing ring therein in accordance with the present invention, the journal against which the sealing ring is intended to bear being withdrawn from the bearing so as to show the position of the parts prior to insertion of the journal.
Figure 2:
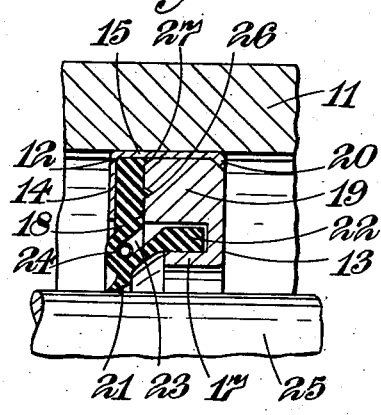
Figure 2 is a similar view showing the journal in place.

Referring first to Figures 1 and 2, these show a housing 11 within which is a sealing ring which is a close fit inside the housing and comprises a casing formed by an angle-shaped member 12 which fits in the housing 11 and has an end-wall 14 and a circular wall 15. A second part 19 of the ring has an end face 13 which constitutes the opposite face of the casing from that constituting the end-wall 14 and a circular wall 17 which projects towards the end-wall 14 but does not meet it so that an annular opening is provided between the walls 14 and 17. Against the end-wall 14 there is located the back of an L-shaped moulded synthetic-rubber sealing ring 18. The sealing ring 18 is clamped firmly against the end-wall 14 by part of the clamping ring 19 which fills the space between the ring 18 and the face 13 and the whole is held firmly together by spinning in the edge of the wall 15 of the ring 12, as shown at 20. This forms a solid construction which will withstand end thrust.

The L-shaped rubber sealing element 18 projects through the annular space between the end wall 14 and the circular wall 17 and has a lip 21 which is located at the heel of the angle section of the ring and is intended to bear on a shaft or journal which passes through the ring. The lip 21 constitutes the effective sealing portion of the ring and as will be seen this is located at the heel of the rubber moulding instead of being constituted by the toe portion of the flexible member as in the usual construction. One wall 22 of the rubber moulding extends in a direction first away from the shaft which is to pass through the oil seal and then parallel with the axis of the shaft into the space between the wall 17 and the clamping ring 19. This portion of the rubber sealing element thus re-enters the casing and between the re-entering portion and the part where the rubber is clamped against the end-wall 14 there is a groove 23 which contains a spiral spring 24 extending all round the ring and joined to itself at its ends. This spring serves to maintain the sealing ring in contact with the shaft.

As viewed in Figure 1 the shaft on which the sealing member is to operate is omitted and the parts are shown in the position which they take up prior to the insertion of the shaft. In Figure 2 a shaft 25 is shown in position and it will be seen that the lip 21 has been pushed outward a little so that it is bearing lightly and yieldingly upon the shaft surface and constitutes an effective oil seal. It will be observed that the spring 24 is protected from the access of oil or any fluid which may be under pressure on the portion of the ring which lies to the left as viewed in the figure and against which pressure the oil seal lip 21 will hold the fluid from passing towards the right. Thus the spring and all the internal parts of the sealing ring are protected from access of such fluids whether corrosive or not.

It will be observed that the ring 19 is provided with a circumferential groove 26 and is also chamfered at its edge at 27. It is found that by thus recessing and if desired chamfering the ring 19 it is afforded a secure grip upon the rubber of the ring 18 so that when the casing is spun over at 20 and pressure is applied to the rubber to clamp it the tendency for the rubber to creep inwardly toward the shaft is controlled or prevented. The re-entrant wall 22 of the rubber ring 18 is not clamped but is left free to take up any position which the forces bearing on the ring may dictate. The spiral spring 24 is of such diameter that it will maintain the sealing member in contact with the shaft 25.

The diameter of the exterior wall 15 of the ring 12 is such as to make a tight pressed fit against the housing 11 so as to prevent leakage around the ring. Although in Figures 1 and 2 the seal is not shown as clamped endwise it can be clamped as tightly as desired in an axial direction and can be employed as a locating washer for bearing against a ball bearing housing or the like. The spring 24 cannot come out however much the sealing element 18 may wear, at all events until it is entirely worn through. Instead of using a spiral spring such as the spring 24 a ring of other elastic material such as rubber could be employed.

Although in the construction illustrated in Figures 1 and 2 the casing is shown as constituted by one angle section ring 12 and a clamping ring 19 it is to be understood that the flange 17 and the part carrying the face 13 could be constituted by a second angle shaped ring if desired; this is illustrated, for example in Figures 7 and 8 hereinafter described.

Figure 3:
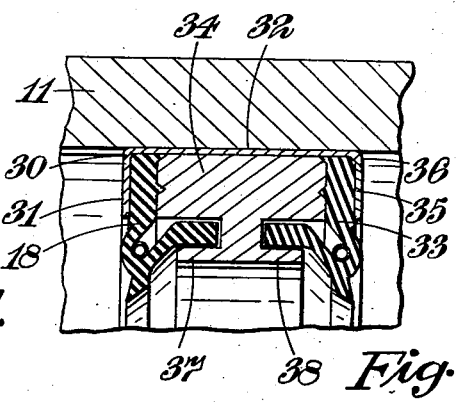
Figure 3 is a view similar to Figure 1 showing a double sealing ring with two sealing members facing in opposite directions.

Referring now to Figure 3, this shows a housing 11 as before within which there is located a double sealing ring consisting of an angle-section casing member 30 having an end-wall 31 and a circular wall 32 and within the casing member two sealing elements 18 and 33 which face in opposite directions. Between the sealing elements there is a clamping ring 34 and the whole is held firmly together by means of a washer 35 bearing on the outside of the sealing element 33 and held in place by spinning over the casing ring 30 at 36. The sealing elements 18 and 33 are similar to the sealing element 18 of Figure 2 and do not require further description. The clamping ring 34 is provided with two flanges 37 and 38 which correspond with the flange 17 of Figure 1. Such an oil seal is capable of preventing leakage of oil along the shaft in both directions or alternatively of preventing leakage in one direction and ingress of foreign matter in the other direction.

Figure 4:
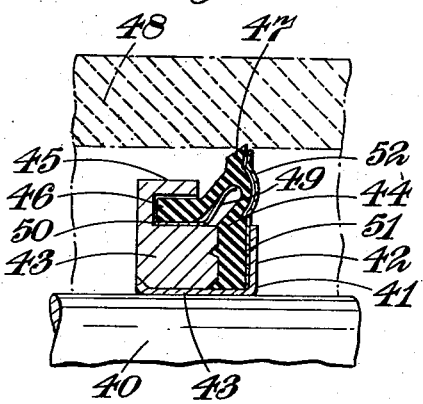
Figure 4 is a view of another construction showing the sealing ring reversed so that it points outwardly and works on the internal surface in a housing.

Referring to Figure 4, this shows a seal mounted on a shaft 40 which comprises an angle-section casing 41 having an end-wall 42 and a circular wall 43 which latter is a pressed fit on the shaft 40. The end-wall 42 projects outwardly from the shaft. A clamping ring 43 presses a rubber sealing element 44 against the end wall 42 and the clamping ring is provided with a flange 45 which extends around and protects a re-entering portion 46 of the sealing element 44. The sealing element is of the same shape in section as the elements in Figures 1 to 3 already described but its sealing lip 47 projects outwardly instead of projecting inwardly and it bears on the interior of a housing which surrounds the shaft 40 when in use and is indicated in Figure 4 at 48. A spring 49 is accommodated within the sealing element 44 in the groove 50 and presses outwardly; this spring is in the form of a steel ring with an outwardly flared crown of teeth like the teeth of a comb. In order to further stiffen up the construction a washer 51 is provided, which is clamped between the back of the sealing element 44 and the end-wall 42, and has a number of spring fingers 52 extending radially outward from it and bearing on the outside of the sealing lip 47. The metal of the washer 51 and the spring fingers must be thin enough to permit such deformation as is required and to afford only the necessary flexible support to the lip 47. Such a flexible washer with spring fingers could be incorporated in the constructions of Figures 1 to 3, if desired. The washer 51 can be applied separately outside the end-wall 42 if desired instead of being clamped up with the end-wall.

Figure 5:
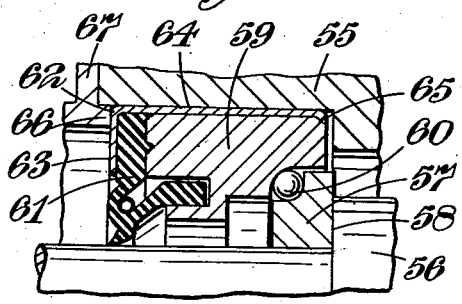
Figure 5 is a view similar to Figure 3 showing an alternative construction which incorporates a ball race.

Referring now to Figure 5, this shows a bearing housing 55 for the support of a shaft 56 and the sealing ring according to the present invention is in this instance incorporated along with a ball bearing for supporting the shaft and sustaining it against both radial and end thrust. A ball race member 57 is provided on the shaft 56 and bears against a shoulder 58 on the shaft. An outer ball race member 59 co-operates with the race member 57 and between the two members there is a ring of balls 60. The outer ball race member 59 constitutes also a clamping ring for an oil sealing element 61 of similar form to that already described. The sealing element 61 is clamped between the clamping ring 59 and an angle shaped casing member 62 having an end-wall 63 and circular wall 64 spun over at 65 as already described. A shoulder 66 on a retaining flange 67 serves to support the whole bearing against end thrust and the retaining member 67 is appropriately secured to the housing 55. It will be seen that in this case the construction is expected to take the end thrust of the ball race 60 as well as to provide an oil seal.

Figure 6:
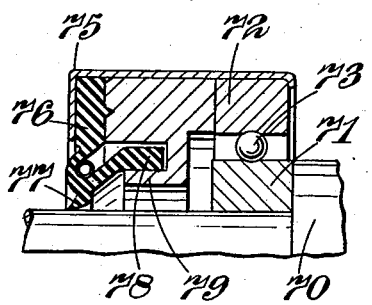
Figure 6 shows an alternative ball race construction.

Figure 6 shows an alternative construction in which a shaft 70 carries a ball race member 71, and the clamping ring 72 bears against an outer race member 74, a ring of balls 73 being provided between the members 71 and 74 and adapted to take mainly radial loads. An angle section casing 75 embraces not only the clamping ring 72 but alo the race member 74 and a sealing element 76 is gripped between the casing 75 and clamping ring 72, having a lip 77 to bear on the shaft 70 and a re-entering portion 78 which enters the casing inside a flange 79 on the clamping ring 72. It will be self-evident that other forms of ball race or roller races could be adopted and that the sealing rings of Figures 1 to 4 could, if desired, be juxtaposed against standard ball or roller races and transfer end thrust to or from them. Moreover plain journal bearings instead of ball or roller bearings could be used if desired.

Referring now to Figure 7, this shows a sealing ring located between a housing 80 and a shaft 81 and provided with an angle-section casing member 82, a clamping ring 83 and a rubber sealing element 84. The clamping ring 83 is held against the casing ring 85 by a second angle-section ring 185 which carries a flange 86 corresponding to the flange 17 of Figure 1. The distinguishing feature of this construction is that both the arms of the rubber sealing element 84 are clamped firmly to the clamping ring 83, one arm, in the manner already described, by being clamped against the end-wall 85 and the other arm being clamped between the interior of the clamping ring 83 and the flange 86 of the ring 185, which is deformed outwardly after the rubber ring has been assembled in place by means of a rolling pressure applied to the interior of the ring. Grooves 87, 88 in the faces of the clamping ring 83 serve to afford extra grip on the rubber. The casing ring 82 is provided with three or four apertures 88 which are arranged to coincide with inflation passages 89 in the rubber sealing ring 84. The effect is that if a fluid under pressure is caused to bear on that face of the sealing ring which lies to the left, as viewed in the figure, the fluid pressure has access through the passages 89 to the internal groove 90 of the sealing ring and will inflate it, thus tending to press the sealing ring inwardly against the shaft 81 and to make the lip 91 bear more firmly upon the shaft. Consequently with this construction in cases where a fluid under pressure fills the space on one side of the ring and it is desired to seal such fluid from passage along the shaft 81, the effect is secured that the greater the pressure the more certain is the sealing and it becomes possible in suitable instances to dispense with the employment of a spring such as the spring 24 of Figures 1 and 2.

Referring to Figure 8, this shows a housing 92 and a shaft 93 between which is located an oil seal comprising a casing member 94 similar to the casing member 85 of Figure 7, already described, a clamping ring 95, a second casing member 100 and a rubber sealing element 96. These parts are all similar to the parts previously described, but instead of a spiral spring such as the spring 24, or means of inflation as in Figure 7, there is provided a spring member 97 which is located between the re-entering portion 98 of the ring 96 and the clamping ring 95. This spring member is made of a sheet of steel bent around to fit into the space referred to and provided along one edge with a number of spring teeth 99 like the teeth of a comb which are bent down into the groove of the sealing element 96 and serve to press it yieldingly towards the shaft 93.

In Figure 9 there is shown a duplex sealing ring comprising two rubber sealing elements 101, 102 shaped similarly to those already described and both bearing on a shaft 103 one behind the other. The oil seal comprising these two sealing elements has a casing 104, the circular portion 105 of which fits into a housing 106 and is long enough to embrace both the sealing elements and two clamping rings 107, 108 and to hold the whole together firmly.

In Figure 10 two rubber sealing elements are employed 110, 111 which face toward one another and bear on a shaft 112. There are three clamping rings 113, 114, 115 and the whole is held together by a single angle-shaped casing member 116, the casing member fitting in a housing 117. The two sealing elements 110, 111 enclose between them a lubricant chamber 118 which is fed with lubricant under pressure from a passage 119 in the housing. The central clamping ring 114 has a circumferential groove 120 to convey the lubricant to a number of passages 121 which are located around the circumference of the clamping ring 114 and serve to conduct the lubricant into the chamber 118. The shaft 112 has a number of oil holes 122 which communicate with an oil passage 123 running through the centre of the shaft. Thus lubricant is conveyed to the shaft under pressure by the aid of oil sealing elements in accordance with the invention without permitting the lubricant to have access to the general space around the shaft outside the oil seal. Such an arrangement is frequently useful where shafts such as cam shafts or crankshafts are drilled out to receive oil passages and convey lubricant to elements mounted along the shaft.

In Figure 11 there is shown an oil seal which is similar in general to the constructions already described, comprising a rubber sealing element 130 bearing on a shaft 131 and held against a casing member 132. In this instance instead of holding the clamping ring 133 in place by spinning over the edge of the casing member 132, the clamping ring is screwed into the casing 132. This sometimes facilitates assembly or may permit of changing a rubber sealing element such as 130 after it has worn out without removing the casing 132 from its housing.

In instances where seals in accordance with the invention have to be used in positions where they hold back corrosive liquids it may sometimes be necessary that no metal of any kind should be exposed to the liquid or gases on the pressure side of the ring. It has already been pointed out that with any of the constructions described the internal spring and like metal parts are protected from access of the pressure fluid, but in cases where no metal whatever may be exposed, as, for example, in preventing leakage along the shafts of pumps used for dealing with corrosive liquids it is possible to cover the metal parts with anti-corrosive material such as rubber and one way of doing this would be to cover with rubber the exposed metal of any of the constructions hereinbefore described. An alternative construction is shown in Figure 12 where the rubber sealing element 140, in itself substantially like the sealing elements already described, is vulcanised on to the exterior of a casing member 141 so that it entirely protects the flat face thereof. The casing member 141 after being vulvanised to the rubber is spun over a clamping ring 142 and it will be seen from a study of the drawings that the casing member can be made to fit into a housing while the sealing element bears on a shaft 143 and that the rubber 140 will bear against the internal face of the housing and prevent access of corrosive fluid to the casing member 141 as well as to the parts within the sealing element such as the spring 144 and the clamping ring 142. In the positions referred to, such as the inside of anti-corrosive pumps, the shaft 143 would normally be made of either a stainless alloy or be covered with corrosion resisting material and the housing would be lined with corrosion resisting material so that all the parts accessible to the corrosive fluid would be protected.

It will be evident that the invention is not limited to any particular manner of securing together the casing, the rubber sealing element and the clamping ring, and that instead of using a casing which is held in the housing by making it a tight fit therein it could, alternatively, be screwed or otherwise fixed in place. Also that any of the constructions illustrated could be inverted, that is to say the casing made to fit tightly around or otherwise be secured to a shaft and the rubber sealing element fit against an internal surface similarly to Figure 4.

One advantage of the constructions described is that means may be provided for withdrawing the sealing element from the housing in which it is a tight fit, on account of the solid construction of the casing when assembled. For this purpose holes for screw-eyes may be drilled and tapped through one of the flat faces (such as 16, Figure 1 or 185, Figure 7) of the casing into the clamping ring.

Even if the seal is of hollow construction, that is to say if the solid clamping ring hereinbefore referred to is replaced by some lighter member, withdrawal holes can be incorporated at the back as the sealing face of the seal is totally enclosed and bonded, and no fluid can enter the interior of the construction from the side against which the ring seals off passage of fluid, whereas with ordinary leather angle-rings the pressure fluid has access to the interior and would leak through withdrawal-holes.

I claim:

1. As an article of manufacture, an annular sealing element of flexible elastic material and substantially L-shaped in cross section, one flange of the element extending radially of the element and the other extending substantially axially thereof and terminating radially inwardly of the outer end of said first named flange, an annular sealing lip formed upon the element at the external angle at the junction of the flanges and means within the internal angle opposite said lip for pressing the latter against a part to be sealed.

2. As an article of manufacture, an annular sealing element of flexible material and substantially L-shaped in cross section, one flange of the element extending radially of the element and the other extending substantially axially thereof and terminating radially inwardly of the outer end of said first named flange, an annular sealing lip at the external angle at the junction of the flanges, and an axially inclined annular recess formed in the material of said element within the internal angle thereof opposite said lip.

3. As an article of manufacture, an annular sealing element of flexible material and substantially L-shaped in cross section, one flange of the element extending radially of the element and the other extending substantially axially thereof and terminating radially inwardly of the outer end of said first named flange, an annular sealing lip at the external angle at the junction of the flanges, and an annular recess formed in the material of said element within the internal angle thereof opposite said lip and resilient annular means within said recess for pressing said lip against a part to be sealed.

4. In an assembly including a movable shaft member and a stationary housing member, the combination of a sealing element and mounting means therefor, said sealing element being formed of flexible material and substantially L-shaped in cross section, one flange of the element extending radially of the element and the other flange extending substantially axially thereof and terminating radially inwardly of the outer end of said first named flange, the ends of said flanges being thus spaced apart, an annular sealing lip formed upon the element at the external angle at the junction of the flanges and contacting one of said members, said mounting means comprising a member carried by the other of said members and adapted for engagement with said radially extending flange and also with said axially extending flange to give lateral support to said sealing element, and resilient annular means within said recess for pressing said lip against the member with which it contacts.

5. A seal of the class described comprising, in combination, an annular sealing element of flexible material and substantially L-shaped in cross section, one flange of the element extending radially of the element and the other extending substantially axially thereof, an annular sealing lip at the external angle at the junction of the flanges and a mounting means for said sealing element comprising an annular angle section member in interfitting relation with an annular member formed with an annular groove, said radially extending flange of said sealing element being clamped between juxtaposed end faces of said interfitting members and said axially extending flange of said element being engaged with said groove in said annular member so that said axially extending flange provides axial support for said element.

6. In an assembly including a movable shaft member and a stationary housing member, the combination of a sealing element and mounting means therefor, said sealing element being formed of flexible material and substantially L-shaped in cross section, one flange of the element extending radially of the element and the other flange extending substantially axially thereof, an annular sealing lip formed upon the element at the external angle at the junction of the flanges and embracing said shaft member, said mounting means carried by said housing member and comprising an angle section member in interfitting relation with an annular member formed with an axially extending groove, said radially extending flange of said sealing element being clamped between juxtaposed end faces of said interfitting members and said axially extending flange of said element being engaged with said groove in said annular member so that said axially extending flange provides axial support for said element, together with means co-acting with said recess of said sealing element for pressing said sealing lip against said shaft.

7. A seal of the class described comprising, in combination, an annular sealing element of flexible material and substantially L shaped in cross section, one flange of the element extending radially of the element and the other flange extending substantially axially thereof, an annular sealing lip at the external angle at the junction of the flanges and a recess formed in the material of said element within the internal angle thereof opposite said lip and resilient annular means within said recess for pressing said lip against a part to be sealed, and mounting means for said sealing element comprising an annular angle section member in interfitting relation with an annular member formed with an annular groove opening axially toward the sealing element, said radially extending flange of said sealing element being clamped between juxtaposed end faces of said interfitting members and said axially extending flange of said element being engaged with said groove in said annular member so that said axially extending flange provides axial support for said element so that the groove containing said pressing means is substantially sealed off.

8. A seal having in combination, a plurality of sealing elements of flexible material and substantially L-shaped in cross section, one flange of each element extending radially of the element and the other extending substantially axially thereof and terminating radially inwardly of the outer end of said first named flange, an annular sealing lip at the external angle at the junction of the flanges and a recess formed in the material of said element within the internal angle thereof opposite said lip, and resilient annular means within said recess for pressing said lip against a part to be sealed, and mounting means for assembling said sealing elements in spaced longitudinal relation and for engaging said spaced radially and axially extending flanges of said sealing elements so that said axial flanges provide axial support for their associated sealing elements.

9. A seal having in combination, a plurality of sealing elements of flexible material and substantially L-shaped in cross section, one flange of each element extending radially of the element and the other extending substantially axially thereof, an annular sealing lip at the external angle at the junction of the flanges and a recess formed in the material of said element within the internal angle thereof opposite said lip and resilient annular means within said recess for pressing said lip against a part to be sealed, and mounting means for assembling said sealing elements in spaced longitudinal relation comprising an angle section member co-acting with annular members having axially extending grooves, said radially extending flanges of said sealing element being clamped between juxtaposed end faces of said co-acting members and said axially extending flanges of said element engaging with said axially extending grooves in said annular members so that said axially extending flanges provide axial support for their associated sealing elements.

10. A seal having in combination, an annular sealing element of flexible material and substantially L-shaped in cross section, one flange of the element extending radially of the element and the other extending substantially axially thereof, an annular sealing lip at the external angle at the junction of the flanges and an annular recess formed in the material of said element within the internal angle thereof opposite said lip and resilient annular means within said recess for pressing said lip against a part to be sealed, and mounting means for said sealing element comprising three co-acting annular members of which two are of angle section and the third of rectangular section, said radially extending flange of said sealing element being clamped between juxtaposed end faces of one of said angle section members and said rectangular section member and said axially extending flange of said element being engaged between juxtaposed circumferential faces of said second angle section member and said rectangular section member so that said axially extending flange provides axial support for said sealing element.

11. In an assembly including a movable shaft member and a stationary housing member, the combination of a sealing element and mounting means therefor, said sealing element being formed of flexible material and substantially L-shaped in cross section, one flange of the element extending radially of the element and the other flange extending substantially axially thereof, an annular sealing lip formed upon the element at the external angle at the junction of the flanges and embracing said shaft member, said mounting means carried by said housing member and comprising three co-acting annular members of which two are of angle section and the third of rectangular section, said radially extending flange of said sealing element being clamped between juxtaposed end faces of one of said angle section members and said rectangular section member and said axially extending flange of said element being engaged between juxtaposed circumferential faces of said second angle section member and said rectangular section member so that said axially extending flange provides axial support for said sealing element together with means co-acting with said recess of said sealing element for pressing said sealing lip against said shaft.

HORACE FRANCIS PETCH.